United States Patent [19]

Porter

[11] Patent Number: 5,739,753
[45] Date of Patent: Apr. 14, 1998

[54] DETECTOR SYSTEM WITH ADJUSTABLE FIELD OF VIEW

[75] Inventor: James A. Porter, Farmingdale, N.Y.

[73] Assignee: Leviton Manufacturing Co., Inc., Little Neck, N.Y.

[21] Appl. No.: 716,038

[22] Filed: Sep. 19, 1996

[51] Int. Cl.⁶ ............................................. G08B 13/18
[52] U.S. Cl. ................. 340/555; 340/556; 250/DIG. 1; 250/342
[58] Field of Search ................................ 340/555, 556, 340/557, 600, 567, 522; 250/DIG. 1, 342, 353; 361/173, 174, 175

[56] References Cited

U.S. PATENT DOCUMENTS

| | | | |
|---|---|---|---|
| 4,857,912 | 8/1989 | Everett, Jr. et al. | 340/522 |
| 4,960,995 | 10/1990 | Neumann et al. | 250/DIG. 1 |
| 4,970,489 | 11/1990 | Jenkins et al. | 340/555 |
| 5,103,346 | 4/1992 | Chang | 340/567 |
| 5,128,654 | 7/1992 | Griffin et al. | 340/600 |
| 5,138,150 | 8/1992 | Duncan | 340/556 |
| 5,200,624 | 4/1993 | Pederson, Jr. et al. | 250/DIG. 1 |
| 5,567,052 | 10/1996 | Yoshiike et al. | 250/DIG. 1 |

*Primary Examiner*—Brent A. Swarthout
*Assistant Examiner*—Van T. Trieu
*Attorney, Agent, or Firm*—Paul J. Sutton

[57] ABSTRACT

A sensor system to turn on room lights when a person enters such room but avoids nuisance tripping of the system when a person passes near but outside of the region to be monitored. The inclusion of blinder devices which can be individually set, ahead of the sensor elements, permit the region being monitored to be tailored to the particular room or location. Adjusting levers can be used to set the positions of the blinder devices and then covered to prevent tampering with the settings of the blinder devices. Special fasteners can be used to limit access to the adjusting levers.

11 Claims, 7 Drawing Sheets

DETECTOR SYSTEM WITH ADJUSTABLE FIELD OF VIEW

BACKGROUND OF THE INVENTION

1. Field of the Invention

The invention is directed to the field of region detector systems and more particularly to a detector system which can be selectively set to control the region from which signals are accepted.

2. Description of the Prior Art

The region which known detection systems monitor is set by the particular manufacturer. Based on the number of sensors employed and their placement a pie-shaped region is described which is monitored by the system. If the region is larger than the region of interest, nuisance tripping may occur. For example, if it is desired to turn-on room lights when a person enters a room, if the monitored region is too large, false signals may be produced by persons walking by the room in an adjacent corridor but not entering the room.

In an attempt to limit the size of the region being monitored, to that of the room in the example above, peel and strip tape is applied to the exterior of the detector system lens. This is a time consuming exercise and the tape is unsightly and falls off when the adhesive dries out. Also it is quite easy to remove the tape requiring that new tape be installed.

SUMMARY OF THE INVENTION

The present invention overcomes the difficulties noted above with respect to known prior art devices. Individually operated blind elements can be selectively positioned in front of the sensor elements to tailor the region to be monitored to the needs of each location. The blinds can be moved to any position from fully exposing the sensor elements to fully blinding the sensor elements. Since the blinds can be set individually the region to be monitored does not have to be symmetrical about an axis perpendicular the housing of the system. The blind elements are positioned by means of operating levers. A locking panel of the housing about the operating levers prevents tampering with the positions of the blind elements once set. A lens in the housing, over the sensor elements prevents movement of the blind elements by direct contact. It is an object of the instant invention to provide a novel detector system wherein the region to be monitored can be set within such detector system.

It is an object of the instant invention to provide a novel detector system wherein the region to be monitored can be controlled by adjustable blinder elements within such detector system.

It is another object of the instant invention to provide a novel detector system wherein the region to be monitored can be controlled by a series of individually adjustable blinder elements within such detector system.

It is yet another object of the instant invention to provide a novel detector system wherein the region to be monitored can be controlled by a series of individually adjustable blinder elements operated by control levers mounted in a lockable compartment of the housing of such detector system to prevent tampering with the settings of the blinder elements.

Other objects and features of the invention will be pointed out in the following description and claims and illustrated in the accompanying drawings, which disclose, by way of example, the principles of the invention, and the best mode presently contemplated for carrying them out.

BRIEF DESCRIPTION OF THE DRAWINGS

In the drawings in which similar elements are given similar reference characters.

DESCRIPTION OF THE PREFERRED EMBODIMENT

Figure 1:
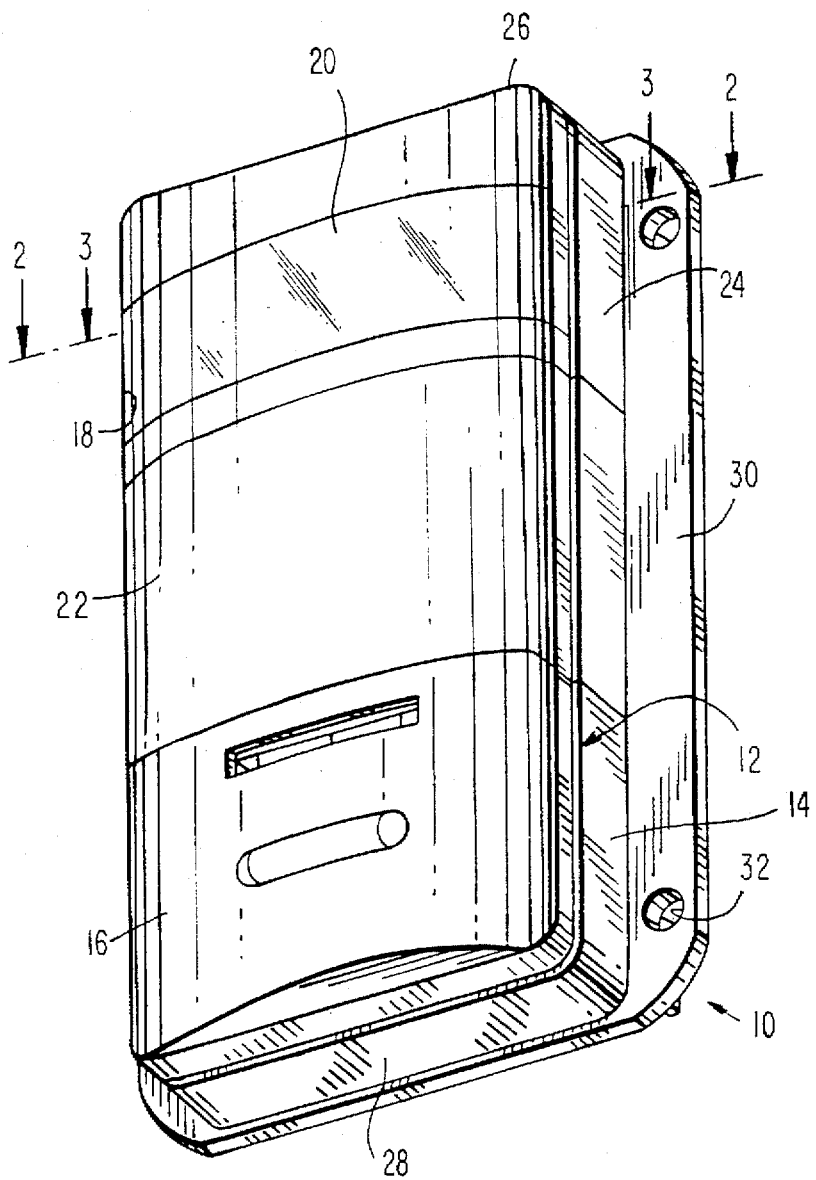
FIG. 1 is a front, lower right perspective view of an assembled detector system of the type found in the prior art and employed herein as well.

Turning now to FIG. 1 there is shown the housing 12 of a typical infra-red occupancy sensor 10 of the type used to house occupancy sensor systems of the prior art and which is also employed to house the occupancy sensor of the instant invention. Housing 12 has a main body portion 14 which includes a front wall 16 which has an aperture 18 therein covered by a lens or window 20. A removable panel 22 permits access to adjusting levers or other operating portions of sensor 10. Main body portion 14 also includes two side walls 24 (only one of which is visible in FIG. 1), a top wall 26 and a bottom wall 28. Back wall 30 closes the back surface of housing 12 and extends beyond top wall 26, bottom wall 28 and side walls 24 to provide a mounting flange. Apertures 32 are placed adjacent the corners of back wall 30 (only two apertures are visible in FIG. 1) to receive suitable fasteners to mount sensor 10 on a wall, ceiling or the like (not shown).

Figure 2:
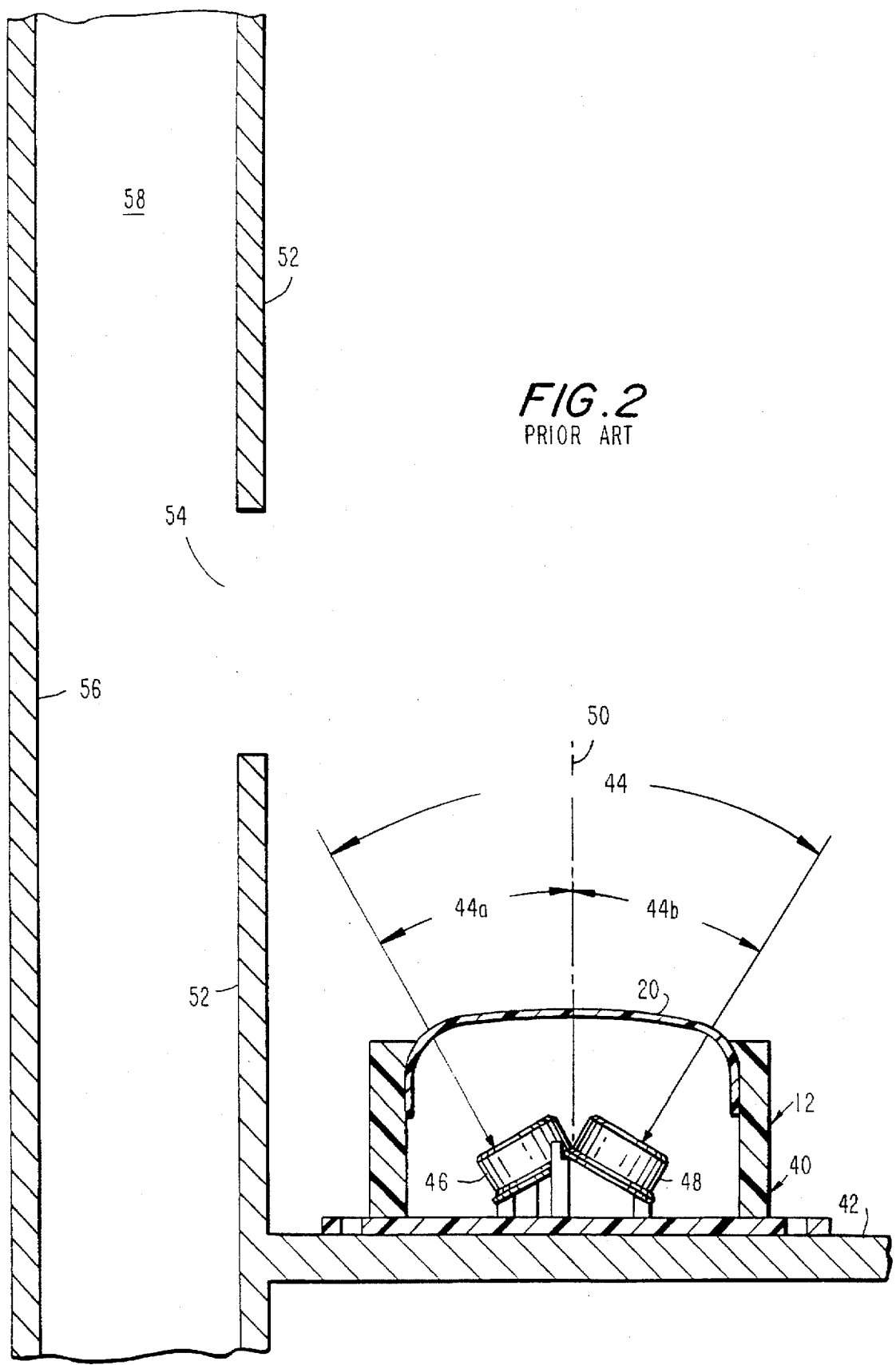
FIG. 2 is a top plan view, partially in section, of the interior of a detector system according to the prior art and taken along the line 2—2 in FIG. 1.

Turning now to FIG. 2 there is shown a top plan view, partly in section, of a prior art occupancy sensor 40 mounted upon a room's rear wall 42 and set to detect the presence of infra-red signals produced by persons in the room and turn on the room's lighting. Because of the width of the acceptance angle 44 of the sensor elements 46, 48 not only will signals from persons in and entering the room be detected but signals from persons walking along the corridor 58 between walls 52 and 56 and passing open doorway 54 will be detected causing nuisance tripping of sensor 40 and the room lights to be turned on. It should be noted that the sensor elements 46, 48 are set to accept signals over equal angles of acceptance symmetrical about the axis 50 which extends perpendicular to the center of sensor 40.

As set forth above, in order to cut down the acceptance angle of the sensor 40, pressure sensitive adhesive tape, peel and strip tape and similar materials may be adhered over lens 20. The tape must be of the correct material to prevent transmittal of the signal therethrough and it must be correctly placed to shield the sensor elements 46, 48 from unwanted signals. The external tape is unsightly, maybe easily removed allowing the sensor 40 to be tampered with or the tape may dry and fall off.

Figure 3:
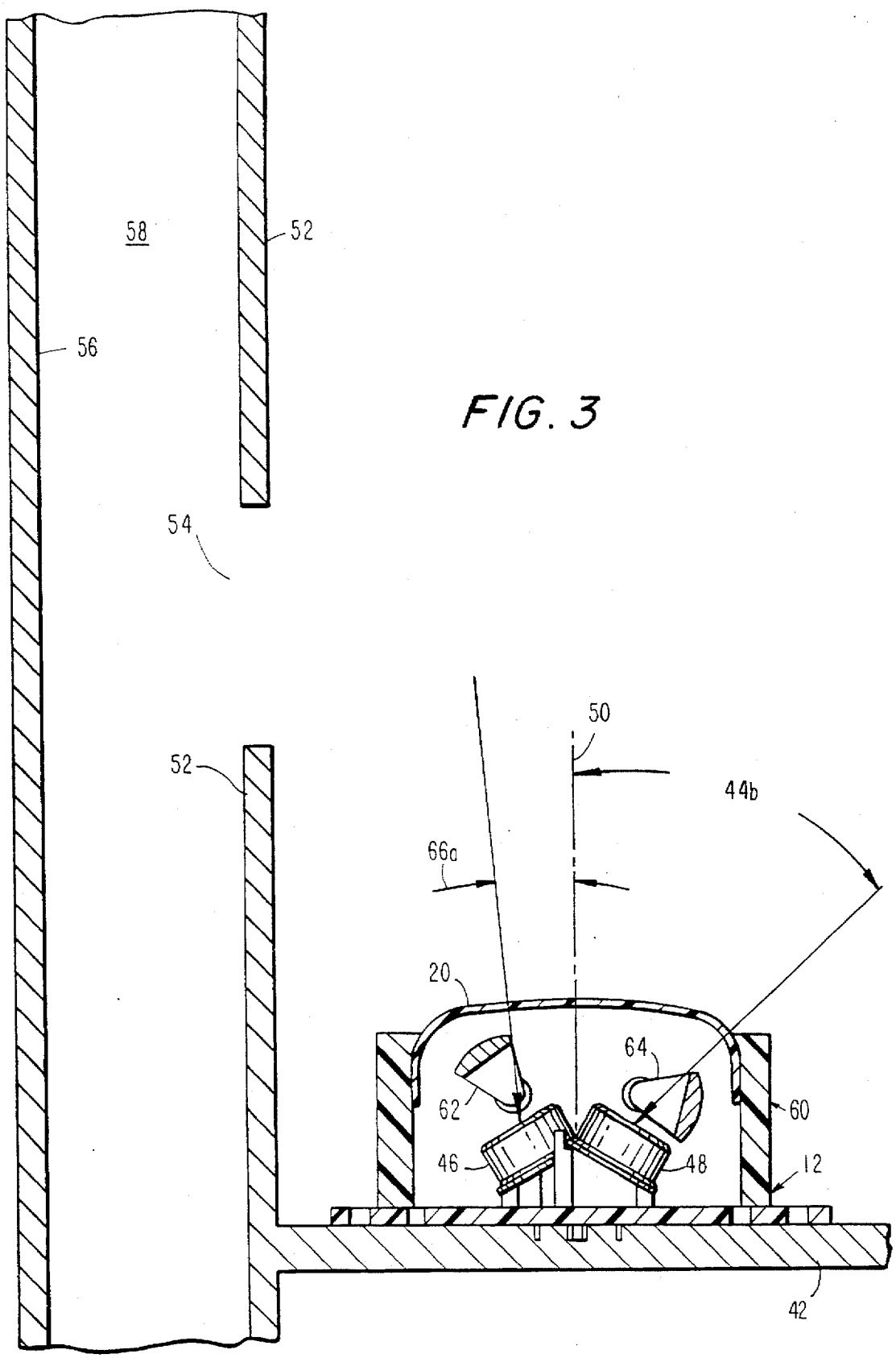
FIG. 3 is a top plan view, partially in section, of the interior of a detector system according to the instant invention and taken along the line 3—3 in FIG. 1.
Figure 4:
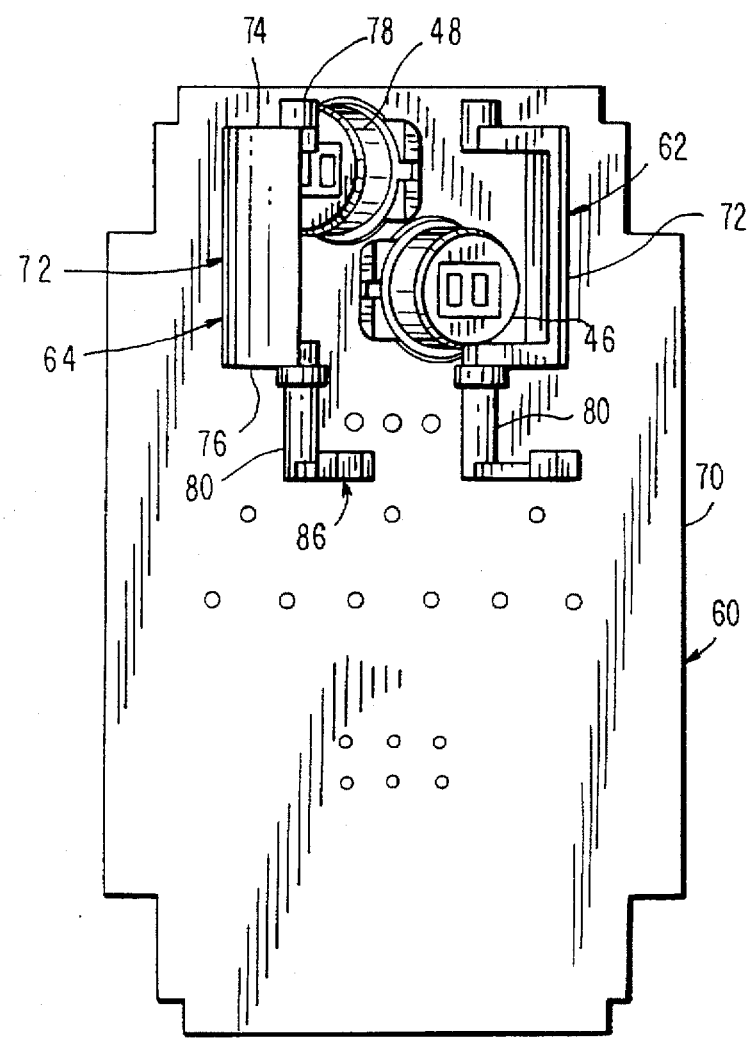
FIG. 4 is a front elevational view of the printed circuit board, sensor elements and blinder elements of the instant invention with the lens and housing omitted to permit a clear viewing of the instant invention.
Figure 5:
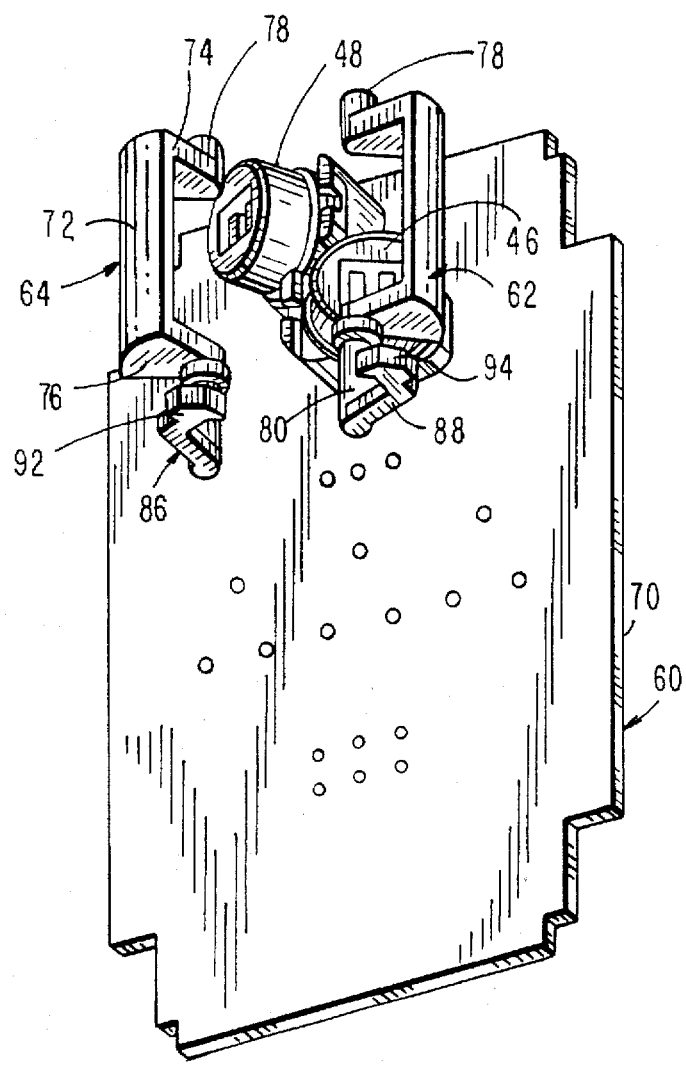
FIG. 5 is a front, lower fight perspective view of elements of FIG. 4.
Figure 6:
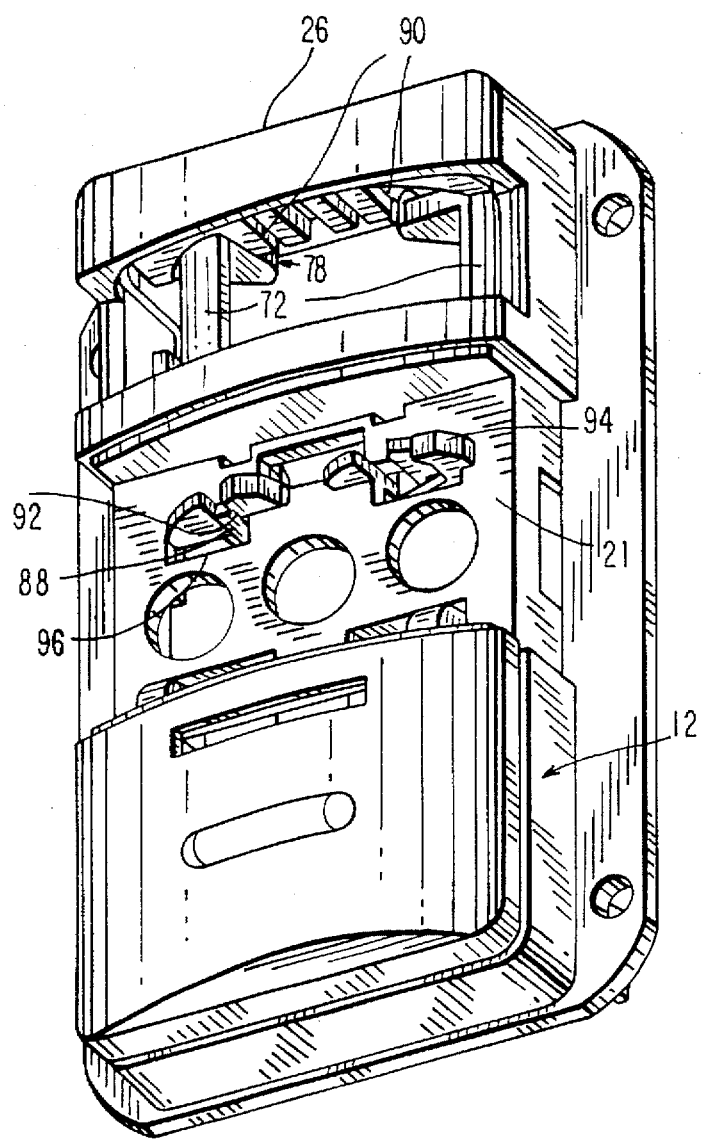
FIG. 6 is a front, lower right perspective view of a detector system according to the instant invention with the lens, sensors, printed circuit board and a removable section of the housing removed to permit a better appreciation of the instant invention.

FIG. 3 is a top plan view, partly in section, of an occupancy sensor 60 constructed in accordance with the concepts of the invention mounted upon rear wall 42 of a room to be monitored. Sensor 60 has infra-red sensor elements 46, 48 mounted within housing 12 and behind lens or window 20. It should be noted that although this description employs passive infra-red sensor elements to receive infra-red signals, this is done for purposes of ease of explanation. The invention is equally applicable to active infra-red sensor systems and systems employing visible light sensors, radio frequency devices, photocells and the like and may include means for generating and transmitting the various signals which will be reflected back to the sensor elements from objects entering or within the room being monitored.

Ahead of sensor element 46 but behind lens or window 20 is placed a blinder element 62. Similarly, blinder element 64 is placed between sensor element 48 and lens or window 20. Each of the blinder elements 62, 64 is independently settable so that the signal acceptance may be set with equal angles to each side of axis 50 such as is shown in FIG. 2 or with unequal angles as shown in FIG. 3. Blinder element 64 is rotated to its full clockwise position so that the acceptance angle 44b of sensor element 48 is the same as that shown in FIG. 2. Blinder element 62 has been rotated to an intermediate counter-clockwise position to reduce the acceptance angle of sensor element 46 to a smaller angle 66a which is less than angle 44a. As a result of this reduction of the acceptance angle of sensor element 46, the sensor system 60 will not monitor the corridor 58 through doorway 54 and will not respond to persons walking along the corridor 58 but not entering the room.

Figure 7:
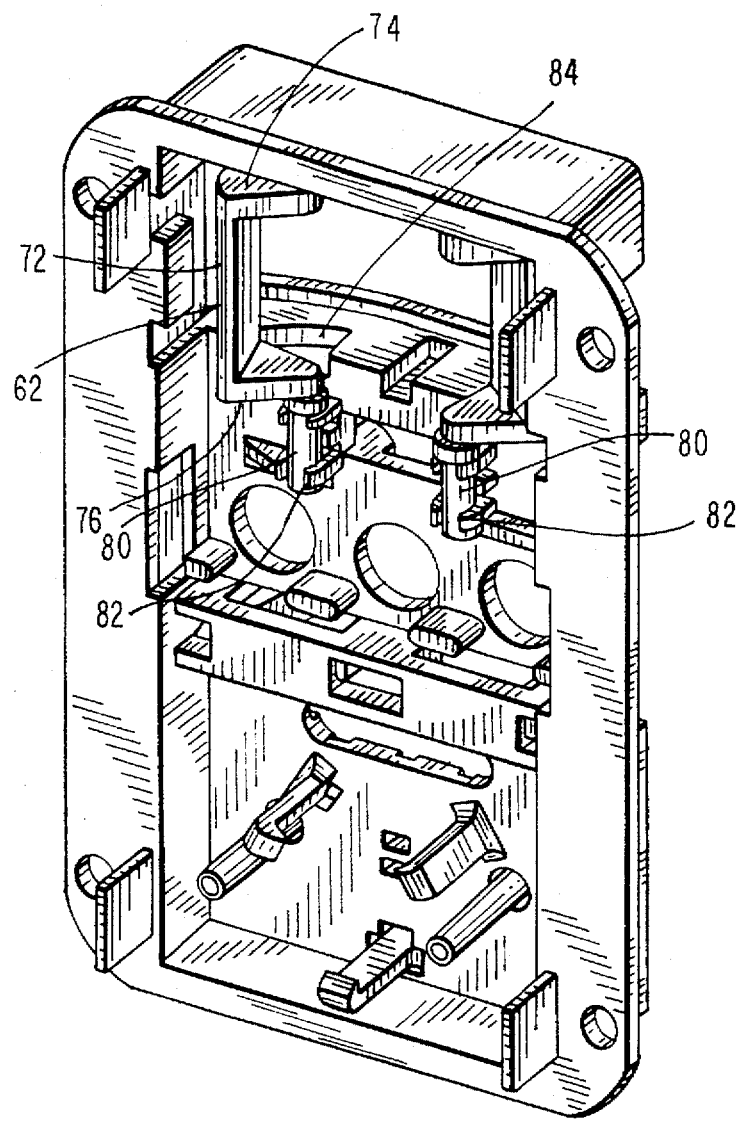
FIG. 7 is a rear, lower right perspective view of the detector system of FIG. 6.

Turning now to FIGS. 4 to 7, there are shown the mechanisms which form the blinder system and permit its operation. The circuit components have been omitted from the printed circuit board 70 in FIGS. 4 and 5, the lens 20 and housing 12 have also been omitted. The lens 20, the removable panel 22, sensor elements 46, 48 and the printed circuit board 70 have been omitted in FIGS. 6 and 7 to provide an unrestricted view of the elements of the instant invention. The details of various aspects of the circuitry can be found in U.S. Pat. No. 5,266,807 issued Nov. 30, 1993 to Benjamin B. Neiger for "Passive Infrared Detection System" and assigned to the assignee of the instant invention. Blinder element 64 has a curved shutter section 72 made of a material which will not pass the signal which detector element 48 is intended to respond to. Shutter section 72 may be made of natural or synthetic rubber, thermoset or thermoplastic material or any other suitable molded or machinable material. The preferred material is a moldable plastic to which suitable additives have been added. A cylindrical stud 78 extends from top wall 74 of shutter section 72 and is positioned in a recess 90 in the interior surface of top wall 26. A second cylindrical stud 80 extends from bottom wall 76 and is held by the pairs of fingers 82 mounted on the rear surface of the housing panel 21 in the region below the removable panel 22, as best seen in FIG. 7. The pairs of fingers 82 are shaped to grip cylindrical stud 80 but permit it to rotate with respect to the sensor element 48. A depression 84 in the lower wall of the lens compartment, supports bottom wall 76 of shutter 72, prevents its downward displacement away from sensor element 48 and limits the movement of shutter section 72 to the desired arc. Blinder element 62 has a similar construction to that described with respect to blinder element 64.

Coupled to the bottom of each of the cylindrical studs 80 is an adjusting lever 86. Adjusting lever 86 is in the form of a bell crank having a first portion 88 perpendicular to the longitudinal axis of cylindrical stud 80 and a second portion 92 perpendicular to the axis of cylindrical stud 80 and first portion 88. Second portion 92 terminates in a head 94. Slots 96 in housing panel 21 permit the adjusting levers 86 to pass therethrough where the heads 94 can be manipulated to adjust the position of the shutters 72. Once the shutters 72 are set in position, the removable panel 22 can be set in place to prevent access to the adjusting levers 86. Special fasteners (not shown) can be used so that the removable panel 22 can not be removed once set in place. For example, screws that have slots with walls that permit the screw to be driven in one direction only. Screws with special drive slots etc.

While there have been shown and described and pointed out the fundamental novel features of the invention as applied to the preferred embodiment, it will be understood that various omissions and substitutions and changes of the form and details of the device illustrated and in its operation may be made by those skilled in the art, without departing from the spirit of the invention.

I claim:

1. A detector system with an adjustable field of view to permit selection of the region to be monitored by said detector system, comprising:
   a) housing means having a back wall, two side walls, a top wall, a bottom wall and a partial front wall joined to one another to form a substantially closed box with an opening in said front wall;
   b) sensing means in said housing means adjacent said opening in said front wall to receive signals from the maximum region which can be monitored by said detector system;
   c) selectively positionable blinder means mounted in said housing means between said sensing means and said opening in said front wall, said blinder means capable of being moved to a selected position between a first limit position fully exposing said sensing means and a second limit position fully covering said sensing means, the position of said blinder means determining the region to be monitored; said blinder means further comprises:
   d) at least two independent blinder elements, each of which can be moved to a different selected position to monitor a region which is not symmetrical about an axis perpendicular to the plane of said back wall; and
   e) at least two operating means, one for each of said blinder elements, to permit said blinder elements to be independently positioned.

2. A detector system as defined in claim 1, further comprising:
   a) a removable section in said front wall positioned adjacent said at least two operating means;
   b) said removable section being removed to permit the operation of said at least two operating means to position said blinder means; and
   c) said removable section being replaced on said front wall after said at least two operating means are positioned.

3. A detector system as defined in claim 2, wherein said removable section has selectively releasable lock means thereon to lock said removable section to said front wall and prevent unauthorized removal of said removable section and tampering with the settings of said at least two operating means.

4. A detector system as defined in claim 1, further comprising:
   a) window means covering said opening in said front wall.

5. A detector system as defined in claim 1, wherein said sensing means is a passive infra-red sensor.

6. A detector system as defined in claim 1, wherein said sensing means is a visible light sensor.

7. A detector system as defined in claim 1, wherein said sensing means is a radio frequency detector.

8. A detector system as defined in claim 1, wherein said sensing means are photocells.

9. A detector system as defined in claim 1, wherein said blinder means and said operating means are unitary.

10. A detector system with an adjustable field of view to permit selection of the region to be monitored by said detector system, comprising:
    a) housing means having a back wall, two side walls, a top wall, a bottom wall and a partial front wall joined to one another to form a substantially closed box with an opening in said front wall;
    b) sensing means in said housing means adjacent said opening in said front wall to receive signals from the maximum region which can be monitored by said detector system;
    c) selectively positionable blinder means mounted in said housing means between said sensing means and said opening in said front wall, said blinder means capable of being moved to a selected position between a first limit position fully exposing said sensing means and a second limit position fully covering said sensing means, the position of said blinder means determining the region to be monitored;
    d) at least two operating means, one for each of two independent blinder elements, to permit said blinder elements to be independently positioned;
    e) a removable section in said from wall positioned adjacent said at least two operating means;
    f) said removable section being removed to permit the operation of said at least two operating means to position said blinder means; and
    g) said removable section being replaced on said front wall after said at least two operating means are positioned.

11. A detector system as defined in claim 10, wherein said removable section has selectively releasable lock means thereon to lock said removable section to said front wall and prevent unauthorized removal of said removable section and tampering with the settings of said operating means.

* * * * *